(12) United States Patent
Paterson et al.

(10) Patent No.: US 6,185,597 B1
(45) Date of Patent: Feb. 6, 2001

(54) METHOD AND SYSTEM FOR EXPANDING A BURIED STACK FRAME

(75) Inventors: Timothy L. Paterson, Redmond; Alan W. Carter, Bellevue, both of WA (US)

(73) Assignee: Microsoft Corporation, Redmond, WA (US)

(*) Notice: Under 35 U.S.C. 154(b), the term of this patent shall be extended for 0 days.

(21) Appl. No.: 08/967,293

(22) Filed: Nov. 7, 1997

Related U.S. Application Data

(63) Continuation of application No. 08/476,121, filed on Jun. 7, 1995, now abandoned.

(51) Int. Cl.[7] ........................................................ G06F 9/00
(52) U.S. Cl. ................................................ 709/108; 717/4
(58) Field of Search ....................................... 709/100, 104, 709/106, 107, 108; 712/228, 242; 711/200, 132, 3; 717/3, 4

(56) References Cited

U.S. PATENT DOCUMENTS

| | | | |
|---|---|---|---|
| 3,786,432 | * 1/1974 | Woods | 364/200 |
| 4,524,416 | * 6/1985 | Stanley et al. | 364/200 |
| 4,969,091 | * 11/1990 | Muller | 395/775 |
| 5,519,866 | * 5/1996 | Lawrence et al. | 395/700 |

OTHER PUBLICATIONS

"Programmer's Guide—Microsoft Visual Basic™, Programming System for Windows™, Version 2.0," Microsoft Corporation, 1992, Chapter 9, pp. 197–224.

\* cited by examiner

*Primary Examiner*—Majid Banankhah
(74) *Attorney, Agent, or Firm*—Schwegman, Lundberg, Woessner & Kluth, P.A.

(57) ABSTRACT

A method and system for growing stack frames is described. According to the invention, actual growth of a stack frame buried below the top of the stack is delayed until such time as the frame is returned to the top of the stack. The invention can be applied, for example, in a source code debugger to provide an improved Edit and Continue capability. In one aspect, the invention is implemented in a computer system that includes a processor (CPU), a stack of frames accessible to the processor, and a program for execution by the processor. The program is composed of a set of procedures. The processor begins executing a procedure of the set and places a stack frame associated with the execution of the procedure on top of the stack. This first stack frame includes a reserved location that can be used later to record an amount or increment by which to grow the frame. The processor begins executing another procedure (or another instance of the same procedure) and places a second stack frame associated with this second procedure execution at the top of the stack above the first frame. The processor receives a command to increase the size of the first frame by a specified increment. While the second frame is above the first frame in the stack, the processor saves the specified increment in the reserved frame location of the buried first stack frame. Thereafter, the processor brings the first frame back to the top of the stack, retrieves the saved increment from the reserved frame location of the first frame, and increases the size of the first frame by the specified increment. The processor then can continue the first procedure execution with the first frame thus increased in size.

21 Claims, 6 Drawing Sheets

METHOD AND SYSTEM FOR EXPANDING A BURIED STACK FRAME

CROSS-REFERENCE TO RELATED APPLICATION

This application is a continuation of U.S. Pat. application Ser. No. 08/476,121, filed Jun. 7, 1995, now abandoned.

TECHNICAL FIELD

This invention relates to computer systems, and more particularly to tools for debugging computer software.

BACKGROUND OF THE INVENTION

A software developer uses a variety of tools and techniques to facilitate the development process. Among the tools the software developer uses are source-level debuggers, which help the developer determine the origin of any bugs or errors in the source code of the program. Certain source-level debuggers provide a feature known as "Edit and Continue." Edit and Continue allows the developer to stop a program during mid-execution, edit the source code and continue executing the program with the edits in effect. Edit and Continue is provided, for example, in the QuickBASIC™ 4.0 interpreted programming environment sold by Microsoft Corporation (Redmond, Wash.), and in the Visual Basics™ 3.0 interpreted programming environment from Microsoft Corporation.

In general, debuggers restrict the kinds of edits that can be made using the Edit and Continue feature. Program changes that cannot be made compatibly with Edit and Continue are referred to as "rude edits." A developer faced with a rude edit can either make the edit and not continue program execution, or can forego edit and continue. The fewer rude edits a debugger has, the more flexible and useful the debugger is.

Developers commonly use the Edit and Continue feature to add a new local variable to a procedure of a program. Typically, variables that are local to a procedure are stored on a stack in a stack frame. A stack is a last-in-first-out (LIFO) structure that allows a processor to place, or "push," data onto it, thus burying any data already present in the stack beneath the most recently pushed data. Thereafter, the processor can retrieve, or "pop," data from the stack in a LIFO fashion. As an item is removed from the top of the stack, the item buried beneath it rises to the top of the stack. Items stored in the stack can be atomic data items or stack frames containing collections of related data. For purposes of this description, a stack frame (or, more simply, a "frame") refers to a contiguous portion of a stack that contains a collection of information (such as variable values) associated with a particular procedure of a program. Typically, a procedure has one or more stack frames associated with it. It is convenient to speak of the stack frame that is positioned uppermost in the stack as being on "top" of the stack, and to speak of a stack frame located beneath another stack frame as being "buried" in the stack below the top of the stack. A stack pointer is typically maintained to indicate the current address of the top of the stack. The stack pointer is often stored in memory or in a dedicated register.

Each stack frame is at any given time in one of three states:

1. Not present in the stack. A procedure's stack frame is created when the procedure begins to execute, and is removed from the stack when the procedure is finished executing. Thus, if the procedure is neither actively executing nor in a state of suspended execution, it has no stack frame in the stack.

2. On top of the stack. The stack frame for the procedure that is currently executing is on top of the stack.

3. Buried in the stack. When, during execution, a first procedure calls or is interrupted by a second procedure (or by another invocation of the first procedure, as in a recursive subroutine call), the stack frame of the first procedure is buried by the creation of the stack frame of the second procedure. That is, a new stack frame for the called or interrupting procedure is created and is pushed onto the stack, thus bringing the stack frame of the calling or interrupted procedure below the top of the stack. Once the second procedure is finished executing, its stack frame is removed from the stack and the stack frame of the first procedure is thus returned to the top of the stack.

Known Edit and Continue facilities allow developers to add local variables to a procedure when that procedure's stack frame is in either of the first two states. If the stack frame is currently not present (i.e., the first state), a new variable or variables can easily be added by allocating the necessary additional space at such time as the stack frame is created. If the stack frame is on top of the stack (i.e., the second state), the necessary additional space is allocated and the stack pointer is adjusted accordingly. However, when the stack frame is buried in the stack, there is no room for it to grow without affecting the rest of the stack.

It is not practical to grow buried stack frames in place. This would require moving other stack frames to avoid destructively overwriting them. When a stack frame is added to the stack, however, references to it (in its current position) are created in potentially countless and unknown places. If the stack frame were moved, these references would be wrong and the system would fail. The system has no method of tracking or finding these references to update them all. Thus known Edit and Continue facilities treat any attempt to add local variables to a procedure with a stack frame that is buried below the top of the stack as a rude edit. In particular, a developer cannot add a local variable to a procedure that either directly or indirectly calls the currently active procedure with a frame that is on top of the stack.

A related problem arises with regard to local "temporaries," (i.e., temporary storage locations used for intermediate calculations local to particular procedures). Temporaries behave like local variables but do not appear explicitly in the source code. A developer attempting to Edit and Continue a program can unwittingly request a program modification that requires adding a new temporary to a procedure and, hence, requires growing the stack frame for the procedure. If the procedure has no stack frame or if its stack frame is on top of the stack, the modification is allowed by known Edit and Continue facilities. However, if the procedure has a buried stack frame, the modification is treated as a rude edit. This seemingly inconsistent behavior can lead to confusion and frustration on the developer's part, because the developer does not know why some edits are allowed and other apparently similar edits are refused.

SUMMARY OF THE INVENTION

One aspect of the present invention gives software developers a way to add local variables and temporaries to a procedure regardless of where the procedure's stack frame is in relation to the top of the stack. In particular, this aspect of the present invention frees developers to add local variables and temporaries even to procedures whose stack frames are buried beneath the stack frames of other procedures. A procedure's stack frame is created and an extra, hidden local variable which is initially preset to a null value such as zero, is maintained for the stack frame. The hidden variable may be stored in the stack frame or elsewhere. When an attempt is made to add a local variable or temporary to a procedure whose stack frame is buried, the hidden variable records the need to grow the frame. Specifically, the amount or increment by which the frame needs to grow is determined and is saved in the hidden variable. The invention delays actual growth of the frame until such time as the frame is returned to the top of the stack. Special processing can be used to handle exceptions that break the normal sequence of returns from called to calling procedures.

In another aspect of the present invention, a method is provided for growing a stack frame in a computer system that includes a processor (CPU), a stack of frames accessible to the processor, and a program for execution by the processor. The program is composed of a set of procedures. The processor begins executing a procedure of the set and places a stack frame associated with the execution of the procedure on top of the stack. A reserved location is maintained that can be used later to record an amount or increment by which to grow the frame. The processor begins executing another procedure (or another instance of the same procedure) and places a second stack frame associated with this second procedure execution at the top of the stack above the first frame. The processor receives a command to increase the size of the first frame by a specified increment. While the second frame is above the first frame in the stack, the processor saves the specified increment in the reserved frame location. Thereafter, the processor brings the first frame back to the top of the stack, retrieves the saved increment from the reserved frame location, and increases the size of the first frame by the specified increment. The processor then can continue the first procedure execution with the first frame thus increased in size.

The invention will be better understood with reference to the drawings and the Detailed Description of the invention that are set forth below. In the drawings, like reference numerals indicate like components.

DETAILED DESCRIPTION OF THE INVENTION

The preferred embodiment of the present invention addresses the problem of how to expand a buried stack frames in a stack with minimal overhead. The ability of the preferred embodiment of the present invention to expand such buried stack frames allows the Continue and Edit feature to be used with buried stack frames and facilitates the use of temporaries with buried stack frames.

Figure 1:
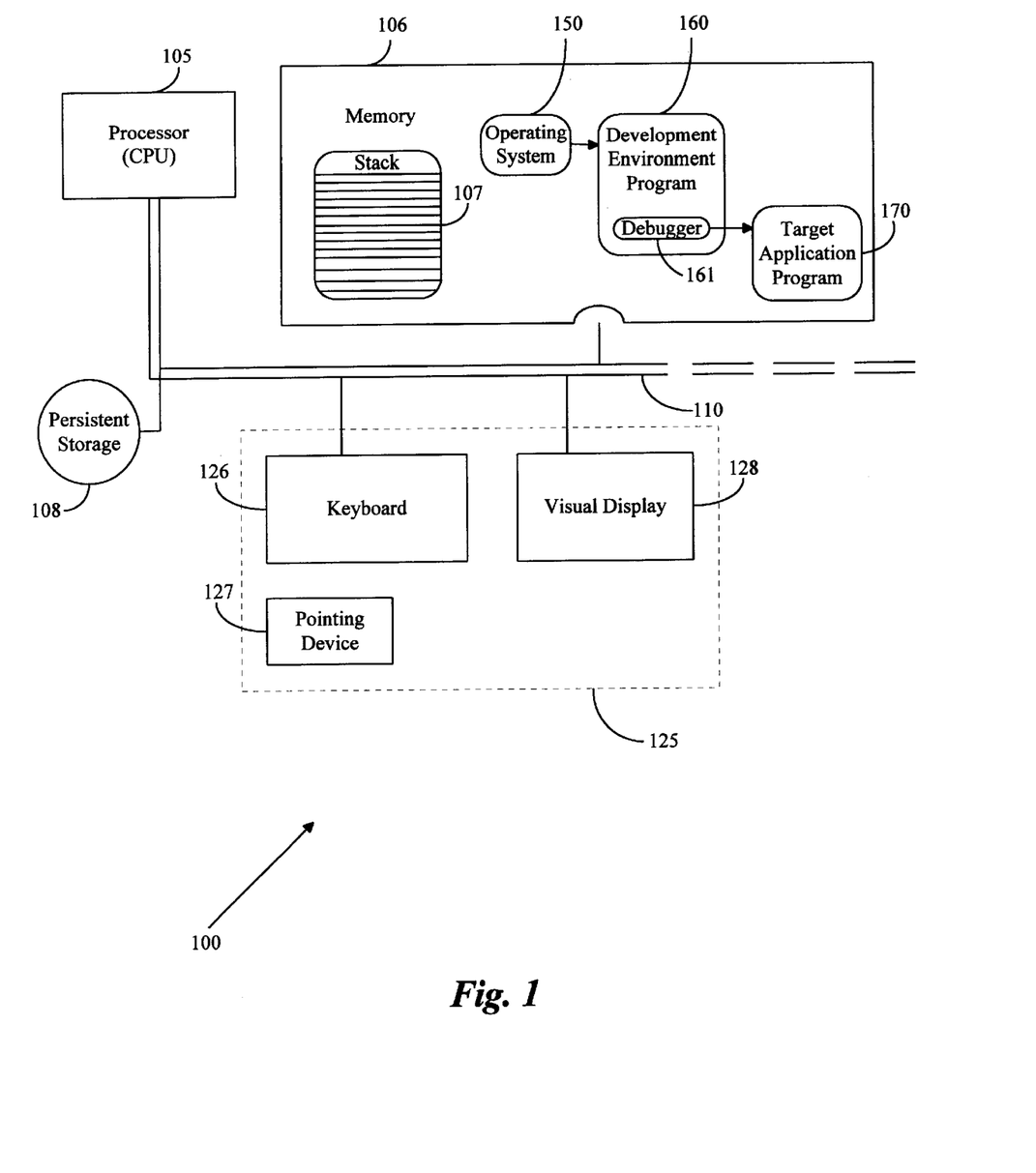
FIG. 1 illustrates the components of a system suitable for practicing a preferred embodiment of the present invention.

FIG. 1 illustrates a computer system 100 suitable for practicing the preferred embodiment of the present invention. The computer system 100 includes a processor (CPU) 105, a memory 106, a persistent storage medium 108, and input/output devices 125 that are coupled by a local bus or interface 110. The input/output devices 125 include a keyboard 126, a pointing device 127, such as a mouse, and a visual display 128. The memory 106 holds a stack 107, an operating system 150, a development environment program 160 and a target application program 170. The development environment program 160 is a program, such as "MICROSOFT" Visual Basic™, that serves as a development environment for other programs, like target application program 170. The development environment program 160 includes a debugger 161 that may be used to locate bugs in programs developed therein. Those skilled in the art will appreciate that the computer system configuration shown in FIG. 1 is merely illustrative and not intended to limit the scope of the present invention. The present invention may be practiced with other computer system configurations.

Figure 2:
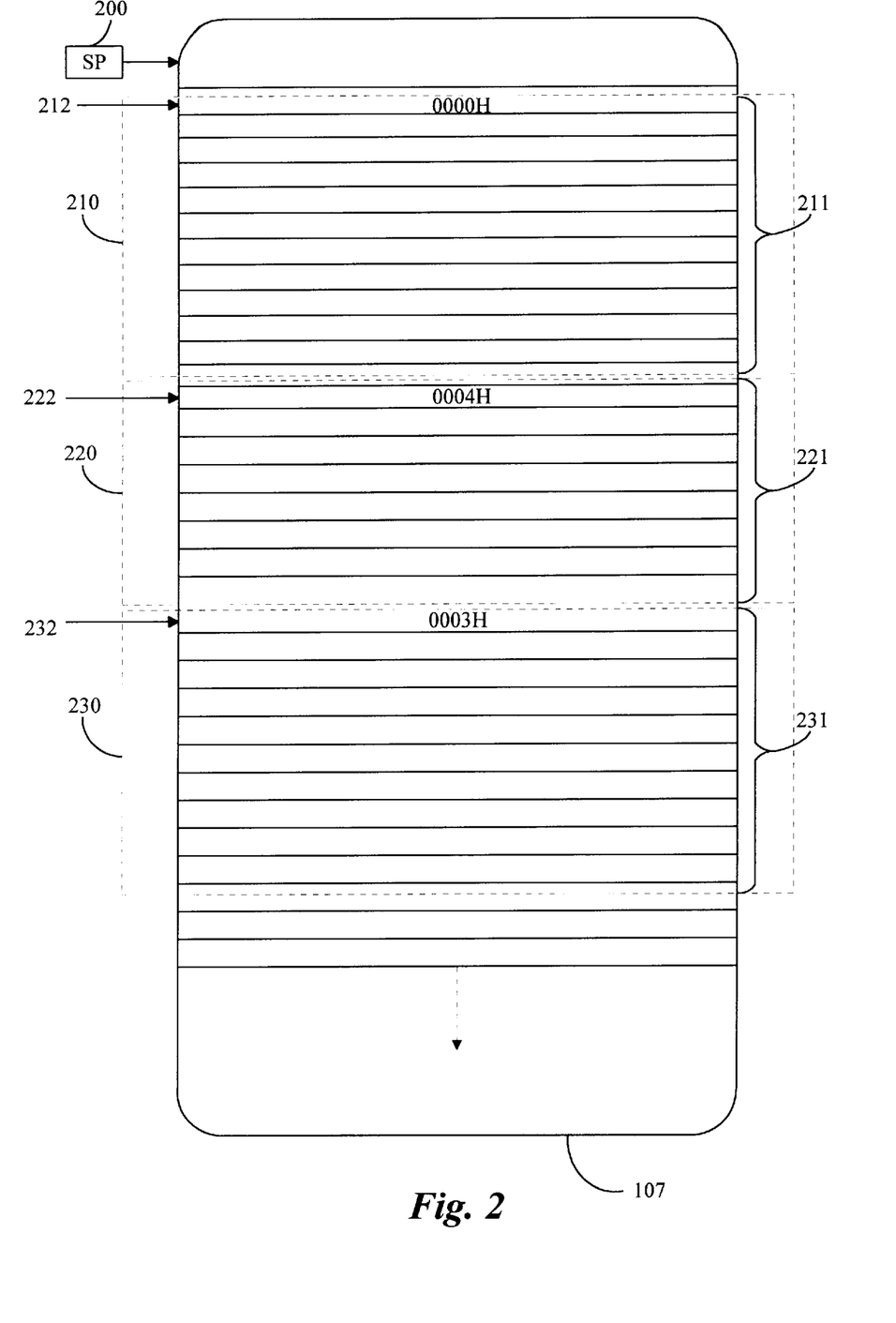
FIG. 2 is diagram of a stack containing buried stack frames with hidden local variables stored in reserved locations of the frames.

FIG. 2 illustrates an example of the contents of stack 107 during the execution of the target application program 170. Stack 107 holds frames 210, 220, and 230. Each frame 210, 220 and 230 is associated with a separate procedure in the target application program 170. Those skilled in the art will appreciate that stack 107 may contain additional frames and that the depiction of the contents of the stack in FIG. 2 is merely illustrative. Each frame 210, 220 and 230 includes storage locations that can be used, for example, to store values of local variables of a procedure during execution of the procedure. In particular, frame 210 includes storage locations 211, frame 220 includes storage locations 221, and frame 230 includes storage locations 231.

The stack 107 includes an ordered contiguous sequence of storage locations of memory 106. Processor 105 maintains a stack pointer 200 that points to or just beyond the first location of the ordered sequence and thereby indicates the top of stack 107. (As will be understood by those skilled in the art, "top" is a conventional term, inasmuch as the ordered sequence of locations can run either upward or downward in the address space of memory 106 depending on the design of processor 105.) Stack pointer 200 may be an internal register of processor 105 or a value stored in memory 106. Frames can be added to and removed from stack 107 in a LIFO fashion. The frame most recently added to the stack is at the top of the stack. In FIG. 2, frame 210 is at the top of stack 107, frame 220 is below frame 210, frame 230 is below frame 220, and any additional frames (not shown) are below frame 230.

The topmost frame of the stack 107 serves as working storage for the procedure that is currently executing on the processor 105. Each frame buried below the top of the stack preserves the state of a procedure that was previously begun and has not yet completed its execution. Some examples are helpful in illustrating the components and use of the stack 107. Suppose that target application program 170 has a set of procedures including two procedures: ALPHA and BETA. During execution of target program 170 by processor 105, if procedure ALPHA calls or otherwise invokes procedure BETA, frame 220 is used to save the state of procedure ALPHA, which is suspended at the point of the procedure call while procedure BETA executes. Frame 210 is associated with this invocation of BETA and used by BETA as its working storage. As another example, if procedure ALPHA calls an intermediate procedure (for example, a third procedure GAMMA) and the intermediate procedure calls BETA, then frame 230 is used to save the state of procedure ALPHA and frame 220 is used to save the state of the intermediate procedure while procedure BETA executes using frame 210 for working storage. As a third example, if procedure ALPHA calls itself recursively two times, then each of frames 210, 220, and 230 represents a separate execution of procedure ALPHA.

According to the invention in this embodiment, each stack frame representing a procedure execution includes a reserved location among its storage locations that is used to facilitate expansion of the stack frame. The reserved locations of frames 210, 220, and 230 are locations 212, 222, and 232, respectively. A frame's reserved location is used whenever a request to increase the frame's size is received while the frame is buried beneath other frames in the stack 107, as will be described more fully below with reference to FIGS. 3A–3C. Those skilled in the art will appreciate that the reserved locations need not be in the stack frames but can also be located elsewhere.

Figure 3A:
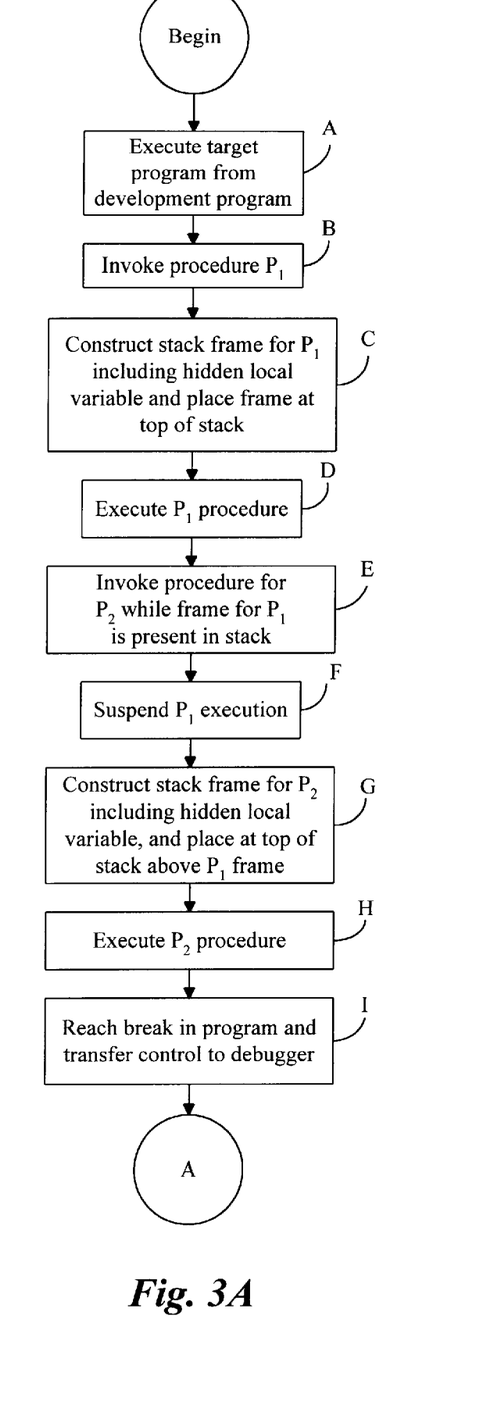
FIGS. 3A, 3B and 3C provide a flowchart of steps for growing a buried stack frames.
Figure 3B:
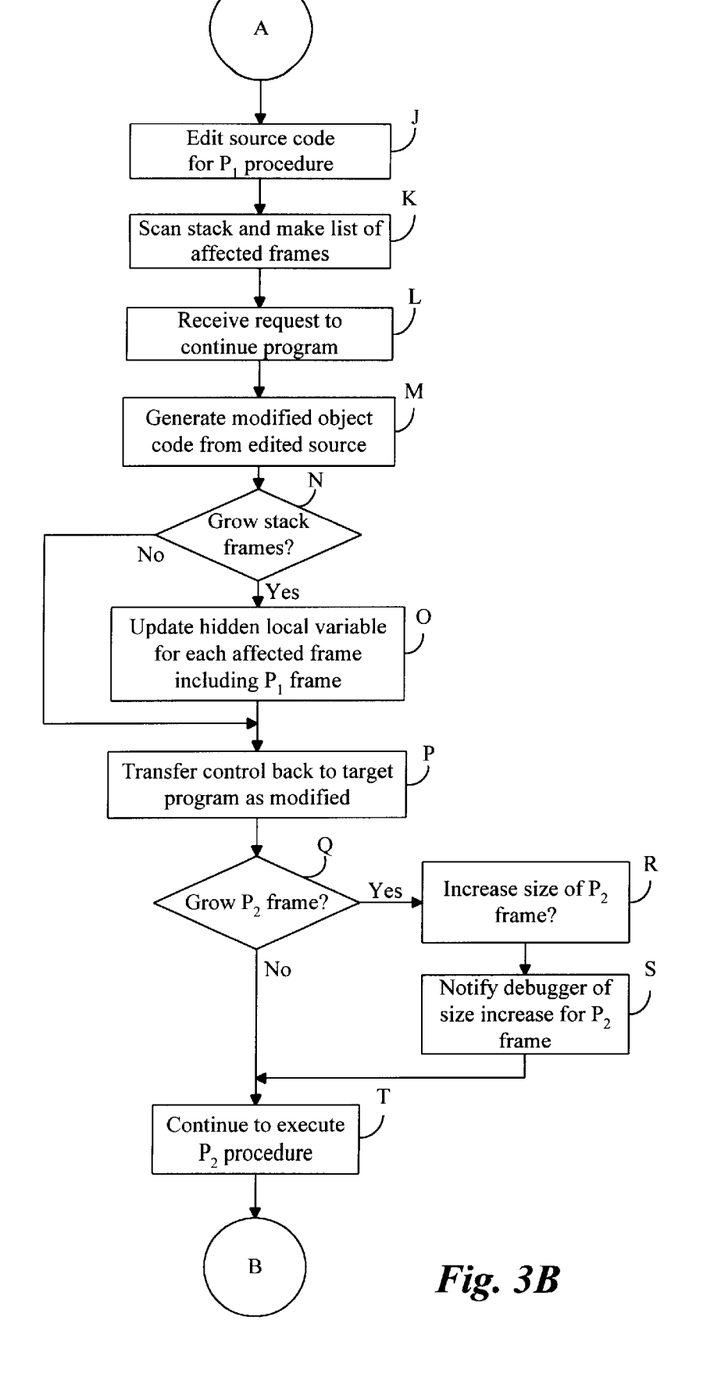
Figure 3C:
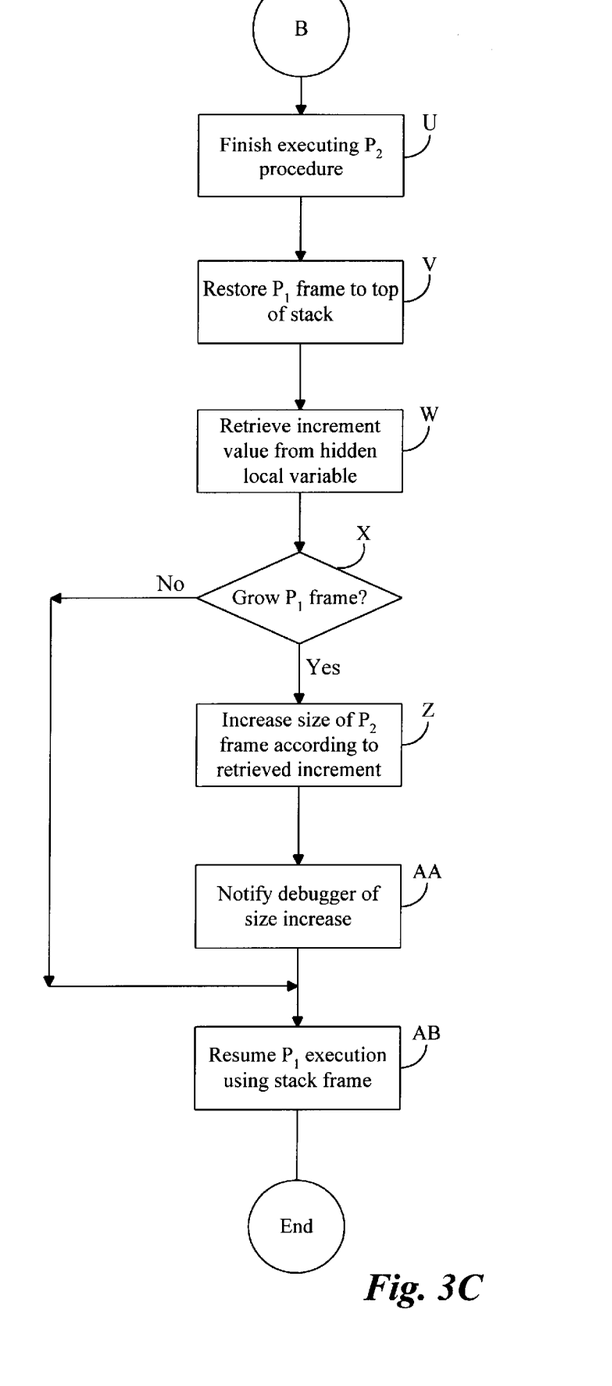

FIGS. 3A–3C illustrate the steps performed by the preferred embodiment of the present invention for growing a buried stack frame to accommodate a local variable added responsively to a source-code edit from the debugger 161. Initially, target application program 170 is executed within development environment program 160 (step A in FIG. 3A). In the course of executing target program 170, a procedure P1 of the target program is called or otherwise invoked (step B).

To provide working storage for P1, a stack frame is constructed and placed at the top of stack 107 (step C). The frame is constructed so as to include the above-mentioned reserved location used for growing the stack frame according to the method of the invention. The reserved location is initialized to hold a predetermined value, such as zero, to indicate that at the outset, it is unnecessary to grow the frame.

The invoked procedure P1 executes (step D) until a second procedure call or invocation takes place (step E). For example, suppose that P1 calls or is interrupted by a different procedure (e.g., procedure ALPHA calls or is interrupted by procedure BETA). As another example, suppose that the procedure P1 calls itself recursively. Also, one or more intermediate or intervening procedure calls may take place between steps D and E. In any event, the second procedure call of step E takes place while P1 is still ongoing, so that P1's stack frame is present in stack 107, either on top of the stack or buried in the stack. The called procedure will be referred to as P2. P2 causes P1 to be suspended pending P2's completion and completion of any intervening or intermediate procedures (step F).

To provide working storage for P2, a stack frame is constructed for P2 and placed at the top of stack 107 (step G). The frame for P2 includes a reserved location used for growing the P2 stack frame according to the method of the preferred embodiment of the present invention. The reserved location is initialized to hold a predetermined value, such as zero, to indicate that at the outset, it is unnecessary to grow the frame. Because the stack frame for P2 is placed at the top of stack 107, it is placed above the stack frame for P1, so that the frame for P1 is a buried frame upon completion of step G.

The procedure P2 executes (step H) until a break in the target program occurs that causes control of the processor 105 to be transferred to debugger 161 (step I). The break can be caused, for example, by reaching a preset breakpoint or encountering a trigger event previously set up with debugger 161 (as is known to those skilled in the art).

Once control is transferred to debugger 161, the user takes advantage of the debugger's source-level debugging capabilities to edit the source code for target program 170 (step J in FIG. 3B). In particular, the user edits source code of the P1 procedure. Debugger 161 scans stack 107 and makes a list of the stack frames affected by the user's edits (step K). After the user is finished editing, the user requests to continue executing target program 170 with the changes made during the editing session incorporated into the program (step L). Accordingly, modified object code of target program 170 is generated from the newly edited source code (step M).

If the edits were such that new local variables or "temporaries" are introduced that would necessitate a size increase in one or more stack frames (step N), the list of affected stack frames is consulted. For each affected frame, the hidden local variable is updated by modifying the value stored in the affected frame's reserve location to reflect the size increment that will be needed to establish the new local variable or variables for that frame (step O). In particular, because the source code of the procedure for P1 has been edited, it is possible that new local variables or temporaries have been added to the procedure for P1. Accordingly, the reserved location in the stack frame for P1 is modified from its original value of zero to a non-zero value. The new value represents the increment by which the frame's size is to be increased once the frame reemerges at the top of the stack. In this way, the reserved location facilitates the deferral of stack frame growth according to the invention.

Control is transferred back to target program 170, as modified by the user's edits (step P). The value of the hidden local variable for the stack frame for P2 is tested by retrieving the value from the frame's reserved location and comparing it against its original preset value to see if the value has changed (step Q). For example, if the hidden local variable was set to zero when the frame was created, it is tested to determine whether it is now non-zero. (Although stack frame for P2 can be at the top of the stack immediately prior to step I, the frame is buried during step I by the transfer of control to debugger 161. Accordingly, all stack frames, including P2's, are treated as buried in step O, and so it is necessary to test P2's frame for possible size expansion upon return from the debugger to the target program.)

If the hidden local variable indicates that the size of P2's frame should be increased, the increase is carried out by allocating additional locations to the frame, which is now at the top of the stack (step R). Debugger 161 is notified that the size change has been made so that it can allow the user to monitor the values stored in the frame (this, of course, is not possible so long as growth of the frame is still being deferred). For example, debugger 161 can provide a "watch" capability that provides a continuously updated display of the value of a local variable, and in particular, a local variable stored in the newly allocated portion of the frame. The procedure of P2 then continues to execute (step T).

At some point the procedure of P2 finishes executing (step U in FIG. 3C). Thereafter, P1's frame is restored to the top of stack 107 (step V) and tested to determine whether it needs to be grown in size. Specifically, the value of the hidden local variable is retrieved from the reserved location (step W) and is tested to see whether it is non-zero, which indicates that the frame is to be expanded in size (step X). If no expansion is indicated, P1's execution resumes without further change to the P1 stack frame. If expansion is indicated, the size of the frame is increased according to the retrieved increment (step Z) and debugger 161 is notified to this effect (step AA). Thereafter, P1 resumes from its previous suspension, using the newly expanded stack frame for its working storage (step AB).

An additional aspect of the embodiment concerns what happens if a procedure terminates abnormally, as by an error in the procedure or a reset of target program 170, so that the normal calling sequence is ignored. The problem raised by this situation can be understood with reference to the example of FIG. 4. Stack 107 contains a topmost frame 400 associated with the currently executing procedure, and a buried frame 430 that is associated with an error-handling procedure. Between frames 400 and 430 are frames associated with intermediate procedure calls, such as frames 410 and 420. Frame 410 has a hidden local variable value stored in its reserved location 412, and frame 420 has a hidden local variable value stored in its reserved location 422.

Figure 4:
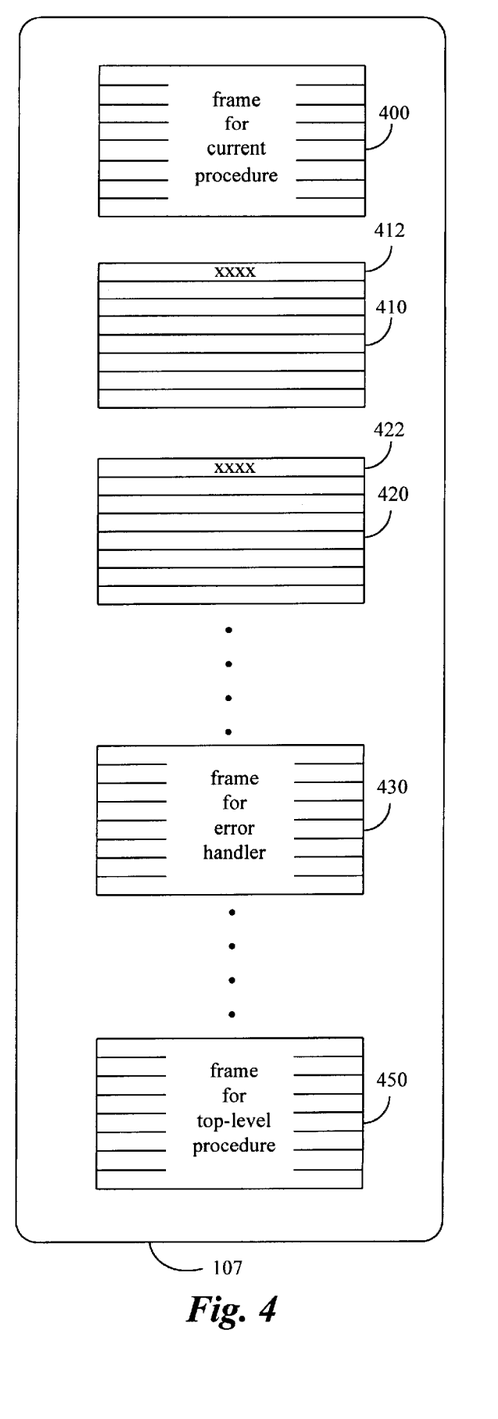
FIG. 4 is a schematic depiction of a stack subject to exception handling.

Suppose that the value in reserved location 412 is non-zero, indicating that frame 410 is to be grown when it reaches the top of the stack. Normally, since the frames of stack 107 are accessed in last-in-first-out fashion, frame 410 will not be needed before it has returned to the top of the stack and had an opportunity to grow to accommodate any new local variables added while it was buried. However, suppose that the current procedure encounters an error that triggers the error-handling procedure corresponding to buried frame 430. In this case, the intermediate frames between frame 400 and frame 430 must be flushed from the stack and any resources associated with the local variables of their respective procedures must be deallocated. Such deallocation, however, requires that the local variables actually be stored in the frames. If an intermediate frame has a non-zero value in its reserved location, it may lack one or more of the local variables that would otherwise be deallocated with respect to its procedure.

A possible solution envisioned by the preferred embodiment to this problem is to grow each intermediate stack frame as it emerges at the top of the stack, even though the frame will be flushed almost immediately thereafter. This ensures that the resource deallocation component of the frame flush works properly. Another solution envisioned by the preferred embodiment is to use a flush routine that checks the reserved location of each frame prior to flushing the frame. If the reserved location value is non-zero, the flush routine determines which new local variables are missing and does not attempt to deallocate their associated resources.

Another example of out-of-sequence accessing of buried stack frames arises when a command is received (as from debugger 161) to reset the target application program without completing it. In this case, all frames from the topmost frame down to the frame for the main top-level procedure of the program (frame 450 in FIG. 4) are flushed. Once again, either of the two solutions discussed above may be adopted to prevent any attempt at deallocating resources associated with local variables not yet established in the frames.

The foregoing specific embodiments represent just some of the ways of practicing the present invention. Many others embodiments are possible within the spirit of the invention. For example, the increment by which a frame is to be grown need not be stored in the frame itself. A data structure maintained especially for the purpose can be used instead. As another example, the invention can be extended beyond the operation of growing a stack frame to provide for deferral of more sophisticated operations. In particular, a pointer to a list of deferred actions or commands that are to be processed with respect to a stack frame when the frame rises to top of stack can be stored in the frame's reserved location(s) or in special-purpose storage. Still another example the invention is readily extensible to a wide variety of program development environments beyond BASIC development environments, including, for example, development environments for other programming languages such as C++. Moreover, the invention can be applied to other stack-based software systems such as nonrecursive tree-walk programs and programs for file system directory traversals. Accordingly, the scope of the invention is not limited to the foregoing specification, but instead is given by the appended claims along with their full range of equivalents.

What is claimed is:

1. In a computer system comprising a processor, a stack holding stack frames and having a top, a program having a set of procedures, and a debugging facility for controlling execution of the procedures by the processor, a method of growing one of the stack frames comprising the computer-implemented steps of:

commencing execution of a first of the procedures of the set of procedures on the processor;

in response to commencing execution of the first procedure, placing at the top of the stack a first stack frame associated with execution of the first procedure;

during execution of the first procedure,
    suspending execution of the first procedure;
    commencing execution of a second of the procedures in the set of procedures on the processor; and
    in response to commencing execution of the second procedure, placing at the top of the stack above the first frame a second stack frame associated with the execution of the second procedure;

during execution of the second procedure,
    receiving in the debugging facility a request to add a local variable to the first procedure;
    determining an amount by which to increase the size of the first frame to provide adequate working storage for the local variable; and
    saving an indication of the determined amount; and after completing the execution of the second procedure,
    bringing the first frame to the top of the stack;
    retrieving the indication of the determined amount;
    with the debugging facility, adding the local variable to the first procedure by increasing the size of the first frame by the determined amount; and
    resuming execution of the first procedure; and during the resumed execution of the first procedure, using the added local variable, whereby the request to add a local variable to the first procedure can be received while the second procedure is executing.

2. The method of claim 1 wherein the first frame includes a reserved location and the indication of the determined amount is stored in the reserved location.

3. The method of claim 1 and further comprising the step of initializing the reserved frame location of the first frame to hold a predetermined default value.

4. The method of claim 3 wherein the saving step comprises replacing the predetermined default value with the indication of the determined amount.

5. A method in a computer system, the computer system having a stack that includes stack frames, the stack having a top, each stack frame having a current size, the method for resizing a stack frame comprising:

placing a first stack frame on the top of the stack;
placing a second stack frame on the top of the stack, whereby the first stack frame is buried below the second stack frame on the stack and is below the top of the stack;
while the first stack frame is below the top of the stack, receiving a request in the computer system to increase the current size of the first stack frame;

storing data that indicates that the first stack frame is to be increased in size; and when the first stack frame reaches the top of the stack, increasing the current size of the first stack frame in accordance with the stored data, whereby satisfying the request through the increasing is delayed until the first stack frame reaches the top of the stack.

6. The method of claim 5 wherein each stack frame has a reserved frame location and wherein the data is stored in the reserved frame location of the first stack frame.

7. The method of claim 5 wherein the stored data includes an amount by which the current size of the first stack frame is to be increased.

8. The method of claim 5 wherein the first stack frame is associated with the execution of a first procedure, wherein the execution of the first procedure is suspended while the first stack frame is below the top of the stack, and wherein while the first stack frame is below the top of the stack and the execution of the first procedure is suspended, the request is received in response to a modification of the first procedure;

the increasing allows the first stack frame to accommodate a size needed for the execution of the modified procedure; and the increasing involves ending the suspension of the first procedure execution and continuing execution using the modified first procedure.

9. A method in a computer system, the computer system having a stack and a computer program, the computer program having procedures to be executed, the computer system for executing procedures, for suspending execution of procedures and for later resuming execution of the suspended procedures, the method for modifying an executing procedure comprising:

allocating a first portion of the stack for use in execution of a first procedure;

commencing execution of the first procedure;

during the execution of the first procedure, invoking a second procedure;

allocating a second portion of the stack for use in execution of the second procedure;

suspending the execution of the first procedure;

commencing execution of the second procedure;

while the execution of the first procedure is suspended and the execution of the second procedure has not completed, modifying the first procedure in a way that results in a need to resize the allocated first portion of the stack;

after modifying the first procedure, allowing the execution of the second procedure to be completed;

resizing the allocated first portion of the stack in accordance with the modifications; and resuming the execution of the first procedure with the resized first portion of the stack.

10. The method of claim 9 wherein the modifying includes editing source code for the program and wherein the resuming of execution executes object code derived from the edited source code.

11. The method of claim 9 wherein:

the modifying includes adding a local variable to the first procedure;

the completion of the execution of the second procedure occurs without premature termination;

the resizing adds space for the local variable to the allocated first portion of the stack; and the resuming involves using the added local variable in the resized first portion of the stack.

12. A computer system comprising:

a stack for storing stack frames, the stack having a top and each stack frame having a current size;

a stack management component that establishes a first stack frame on the top of the stack, establishes a second stack frame on the top of the stack, and restores the first stack frame to the top of the stack;

a receiving component that receives a request to resize the current size of the first stack frame while the first stack frame is below the top of the stack;

a storing component that stores data indicating that the first stack frame is to be resized;

a deferring component that defers processing of a request received by the receiving component while the first stack frame is below the top of the stack; and a resizing component that resizes the first stack frame in accordance with the stored data when the first stack frame reaches the top of the stack.

13. The computer system of claim 12 wherein each stack frame has a reserved frame location and wherein the data is stored in the reserved frame location of the first stack frame.

14. The computer system of claim 12 wherein the stored data includes an amount by which the current size of the first stack frame is to be resized.

15. A computer-readable medium containing instructions for controlling a computer system to perform a method, the computer system having a stack, the stack having a first and second stack frame, the first stack frame being buried below the second stack frame on the stack, the method for resizing a stack frame comprising:

while the first stack frame is buried below the second stack frame on the stack, receiving a request in the computer system to resize the first stack frame;

storing data that indicates that the first stack frame is to be resized; and when the first stack frame is no longer buried, resizing the first stack frame in accordance with the stored data.

16. The computer-readable medium of claim 15 wherein the first stack frame has a reserved frame location and wherein the data is stored in the reserved frame location of the first stack frame.

17. The computer-readable medium of claim 15 wherein the stored data includes an amount by which to resize the first stack frame.

18. The computer-readable medium of claim 15 wherein the first stack frame is associated with the execution of a first procedure, wherein the execution of the first procedure is suspended while the first stack frame is buried, and wherein while the first stack frame is buried and the execution of the first procedure is suspended, the request is received in response to a modification of the first procedure;

the resizing allows the first stack frame to accommodate a size needed for the execution of the modified procedure; and the resizing ends the suspension of the first procedure execution and continues execution using the modified first procedure.

19. A computer-readable medium containing instructions for controlling a computer system to perform a method, the computer system having a stack and a computer program, the computer program having a first procedure and a second procedure, the first and second procedures each having an allocated portion of the stack, the portion of the stack allocated for the first procedure being buried below the portion of the stack allocated for the second procedure, execution of the first procedure being suspended, execution of the second procedure being commenced but not completed, the method for modifying an executing procedure comprising:

receiving an indication that the first procedure is modified in a way that results in a need to resize the portion of the stack allocated for the first procedure;

after receiving the indication, allowing the execution of the second procedure to be completed;

resizing the portion of the stack allocated for the first procedure in accordance with the modifications; and     resuming the execution of the first procedure with the resized portion of the stack.

20. The computer-readable medium of claim 19 wherein the modifying of the first procedure includes editing source code and wherein the resuming of execution executes object code derived from the edited source code.

21. The computer-readable medium of claim 19 wherein:

the modifying includes adding a local variable to the first procedure;

the completion of the execution of the second procedure occurs without premature termination;

the resizing adds space for the local variable to the portion of the stack allocated for the first procedure; and     the resuming involves using the added local variable in the resized portion of the stack.

\* \* \* \* \*